US012104974B2

(12) United States Patent
Kang

(10) Patent No.: US 12,104,974 B2
(45) Date of Patent: Oct. 1, 2024

(54) FREEHUB TORQUE AND SPEED SENSING DEVICE

(71) Applicant: KCLAMBER ELECTRIC TECHNOLOGY CORP, Taicang (CN)

(72) Inventor: Xianbing Kang, Kunshan Jiangsu (CN)

(73) Assignee: KCLAMBER ELECTRIC TECHNOLOGY CORP (CN)

( * ) Notice: Subject to any disclaimer, the term of this patent is extended or adjusted under 35 U.S.C. 154(b) by 394 days.

(21) Appl. No.: 17/422,537

(22) PCT Filed: Oct. 30, 2019

(86) PCT No.: PCT/CN2019/114276
§ 371 (c)(1),
(2) Date: Aug. 12, 2021

(87) PCT Pub. No.: WO2020/147370
PCT Pub. Date: Jul. 23, 2020

(65) Prior Publication Data
US 2022/0099508 A1 Mar. 31, 2022

(30) Foreign Application Priority Data
Jan. 14, 2019 (CN) .......................... 201910032502.5

(51) Int. Cl.
B62M 6/50 (2010.01)
B62M 6/65 (2010.01)
(Continued)

(52) U.S. Cl.
CPC .............. G01L 3/108 (2013.01); B62M 6/50 (2013.01); B62M 6/65 (2013.01); G01P 3/481 (2013.01);
(Continued)

(58) Field of Classification Search
CPC ........... G01L 3/108; B62M 6/50; B62M 6/65; B62M 6/45; G01P 3/481; H01F 27/2885;
(Continued)

(56) References Cited

U.S. PATENT DOCUMENTS 7,047,817 B2 * 5/2006 Lanham ................ G01L 3/1457
73/773
7,806,006 B2 * 10/2010 Phillips ................... G01L 3/242
73/379.07

(Continued)

FOREIGN PATENT DOCUMENTS

CN 102636305 A 8/2012
CN 202455222 U 9/2012
(Continued)

OTHER PUBLICATIONS

Extended European Search Report mailed Sep. 19, 2022; European Patent Application No. 19910339.1.
(Continued)

Primary Examiner — David J Bolduc
(74) Attorney, Agent, or Firm — McDonald Hopkins LLC

(57) ABSTRACT

Provided is a freehub torque and speed sensing device, including a freehub, a dynamic assembly and a static assembly. The freehub includes a freehub body (2) and a freehub fixing housing (1) sleeved on an outer side of the freehub body (2). A load connection portion (204) is disposed at one end of the freehub body (2). A torque sensing deformation unit (203) is disposed at the freehub body (2) adjacent to the load connection portion (204) and includes at least one sensor. The dynamic assembly rotates with the freehub body (2). The static assembly is fixedly connected to an external fixing structure body and includes a primary control unit. The dynamic assembly includes a secondary control unit electrically connected to the sensor. A torque signal is transmitted between the primary control unit and the sec-
(Continued)

ondary control unit in a wireless manner, and the primary control unit supplies power to the secondary control unit in the wireless manner. In this manner, the whole vehicle assembly is more convenient and safer, and the signal stability is high.

17 Claims, 5 Drawing Sheets

(51) Int. Cl.
*G01L 3/10* (2006.01)
*G01P 3/481* (2006.01)
*H01F 27/28* (2006.01)
*H01F 27/36* (2006.01)
*H01F 38/14* (2006.01)
*H02J 50/10* (2016.01)

(52) U.S. Cl.
CPC ......... *H01F 27/2885* (2013.01); *H01F 27/36* (2013.01); *H01F 38/14* (2013.01); *H02J 50/10* (2016.02)

(58) Field of Classification Search
CPC .......... H01F 27/36; H01F 38/14; H01F 38/18; H02J 50/10; B60Y 2200/13; B60B 27/0068; B60B 27/047; B62J 45/411; B62J 45/423
See application file for complete search history.

(56) References Cited

U.S. PATENT DOCUMENTS

| | | | | |
|---|---|---|---|---|
| 8,065,926 B2* | 11/2011 | Meyer | ................... | G01L 3/1478 |
| | | | | 73/862.627 |
| 8,091,674 B1* | 1/2012 | Zhang | ................... | B62J 45/411 |
| | | | | 180/205.1 |
| 8,825,279 B2* | 9/2014 | Kitamura | ............... | B62J 45/411 |
| | | | | 701/33.1 |
| 9,003,900 B2* | 4/2015 | Hsiao | ................... | B62K 25/02 |
| | | | | 73/862.69 |
| 9,341,526 B2* | 5/2016 | Bass | ....................... | B62J 45/42 |
| 9,354,131 B2* | 5/2016 | Lubarsky | ................ | G01L 3/242 |
| 10,610,725 B2* | 4/2020 | Schaefer | ................ | G16H 20/30 |
| 2005/0275561 A1* | 12/2005 | Kolda | ..................... | B60B 27/023 |
| | | | | 340/870.07 |
| 2009/0119032 A1* | 5/2009 | Meyer | .................... | B62J 45/421 |
| | | | | 702/44 |
| 2009/0120210 A1* | 5/2009 | Phillips | .................. | G01L 3/242 |
| | | | | 73/862.338 |
| 2010/0093494 A1* | 4/2010 | Smith | .................... | B62M 3/003 |
| | | | | 482/8 |
| 2012/0022800 A1* | 1/2012 | Lubarsky | .............. | G01L 3/1421 |
| | | | | 702/41 |
| 2012/0234108 A1 | 9/2012 | Janecek et al. | | |
| 2013/0024137 A1* | 1/2013 | Grassi | ....................... | G01L 1/00 |
| | | | | 702/43 |
| 2013/0049447 A1* | 2/2013 | Kitamura | ................ | B62M 9/10 |
| | | | | 301/110.5 |
| 2014/0074348 A1* | 3/2014 | Kitamura | ................ | B62M 6/50 |
| | | | | 701/33.1 |
| 2014/0171258 A1 | 6/2014 | Boudet | | |
| 2015/0311954 A1* | 10/2015 | Tetsuka | ................... | H02J 50/00 |
| | | | | 307/104 |
| 2016/0075177 A1* | 3/2016 | Biderman | ............... | B60L 58/21 |
| | | | | 301/6.5 |
| 2016/0107720 A1* | 4/2016 | Xu | ........................... | B62M 6/50 |
| | | | | 475/4 |
| 2016/0209281 A1* | 7/2016 | Carrasco Vergara | ... | G01L 3/242 |
| 2017/0368871 A1* | 12/2017 | Ebersbach | ............. | B62J 45/411 |

FOREIGN PATENT DOCUMENTS

| | | |
|---|---|---|
| CN | 106323518 A | 1/2017 |
| CN | 106953470 A | 7/2017 |
| CN | 107054542 A | 8/2017 |
| CN | 107600297 A | 1/2018 |
| CN | 107733167 A | 2/2018 |
| CN | 109572916 A | 4/2019 |
| CN | 209634670 U | 11/2019 |
| DE | 4212321 A1 | 10/1993 |
| EP | 2757358 A2 | 7/2014 |
| JP | 2013047080 A | 3/2013 |
| TW | M570944 U | 12/2018 |
| WO | 2015108152 A1 | 3/2017 |
| WO | 2018039870 A1 | 3/2018 |

OTHER PUBLICATIONS

Japanese Office Action dated Jul. 15, 2022; Japanese Patent Application No. 2021-541082.
International Search Report and Written Opinion mailed Jan. 8, 2020; International Patent Application No. PCT/CN2019/114276 filed on Oct. 30, 2019. ISA/CN.
Chinese Office Action dated Jan. 25, 2024; Chinese Patent Application No. 201910032502.5. 11 pages.

* cited by examiner

FREEHUB TORQUE AND SPEED SENSING DEVICE

This application is a U.S. National Stage Application, filed under 35 U.S.C. 371, of International Patent Application No. PCT/CN2019/114276, filed on Oct. 30, 2019, which claims priority to Chinese Patent Application No. 201910032502.5 filed with the CNIPA on Jan. 14, 2019, the disclosures of which are incorporated herein by reference in their entireties.

TECHNICAL FIELD

The present application relates to the application field of sensors, for example, a freehub torque and speed sensing device.

BACKGROUND

As people continuously put forward higher requirements for smart travel, a torque sensor is becoming more and more popular. At this stage, torque structures of an electric bicycle mainly include central axle torque, gear wheel torque, and hook torque, and the torque sensor used in the preceding torque structures of the electric bicycle is disposed on an outer side of a motor. Therefore, a separate sensor circuit is required and thus the whole vehicle assembly is not convenient; and the sensor exposed outside the motor is easily damaged and invalidated.

SUMMARY

The present application provides a freehub torque and speed sensing device with a reasonable structure.

A freehub torque and speed sensing device includes a freehub, where the freehub is assembled on an axle shaft of a rear wheel of a bicycle or an electric bicycle and includes a freehub body and a freehub fixing housing. The freehub fixing housing is assembled on an outer side of the freehub body and connected to a flywheel, and a load connection portion is disposed at one end of the freehub body and connected to a rear wheel hub or a rear hub motor of the bicycle or the electric bicycle. A torque sensing deformation unit is disposed at a journal of the freehub body adjacent to the load connection portion and includes at least one sensor, where the at least one sensor is configured to sense a deformation magnitude of the torque sensing deformation unit and form a torque signal.

The freehub torque and speed sensing device further includes a dynamic assembly and a static assembly, where the dynamic assembly is configured to rotate along with the freehub body, the static assembly is fixedly connected to an external fixing structure body and includes a primary control unit, and the dynamic assembly includes a secondary control unit. The at least one sensor is electrically connected to the secondary control unit, the primary control unit and the secondary control unit are configured to transmit the torque signal between the primary control unit and the secondary control unit in a wireless manner, and the primary control unit is configured to supply power to the secondary control unit in the wireless manner.

The static assembly includes a primary signal processor and a primary induction coil, where the primary signal processor is electrically connected to the primary induction coil. The dynamic assembly includes a secondary signal processor and a secondary induction coil, where the secondary signal processor is electrically connected to the secondary induction coil. The dynamic assembly is connected to the load connection portion of the freehub body, the primary induction coil and the secondary induction coil are configured to perform signal transmission between the primary induction coil and the secondary induction coil in the wireless manner, and the primary signal processor is configured to supply power to the secondary signal processor through the primary induction coil and the secondary induction coil; or the primary signal processor and the secondary signal processor are configured to perform wireless signal transmission between the primary signal processor and the secondary signal processor through an infrared component, and the primary signal processor is configured to supply power to the secondary signal processor through the primary induction coil and the secondary induction coil.

The freehub fixing housing is rollingly connected to the freehub body.

A freehub locking bracket body connection portion is disposed at another end of the freehub body facing away from the load connection portion, where the freehub locking bracket body connection portion is connected to a freehub locking bracket body. A pawl groove is disposed on a circumferential surface of the freehub body adjacent to the freehub locking bracket body connection portion, where multiple pawls are fixed in the pawl groove through a spring structure body.

The dynamic assembly further includes a dynamic assembly housing, and the static assembly further includes a static assembly housing, where the load connection portion of the freehub body is connected to one end of the dynamic assembly housing, and the static assembly housing is clamped to another end of the dynamic assembly housing; the dynamic assembly housing is connected to the secondary signal processor, the secondary signal processor is connected to the secondary induction coil, the static assembly housing is connected to the primary signal processor, the primary signal processor is connected to the primary induction coil, and the primary induction coil and the secondary induction coil are disposed correspondingly.

A primary electromagnetic shielding body is disposed on an outer side of the primary induction coil, and a secondary electromagnetic shielding body is disposed on an outer side of the secondary induction coil.

A speed sensing magnetic ring is disposed on an inner ring wall of the freehub fixing housing and relatively stationary with respect to the freehub fixing housing, and the freehub body is provided with a speed Hall fixing groove. A speed sensing Hall is disposed in the speed Hall fixing groove, and the speed sensing magnetic ring and the speed sensing Hall are disposed correspondingly.

The static assembly housing is connected to a signal output line.

A torque signal line groove, a soft printed circuit board (PCB) via hole, and a speed sensing line groove are disposed on an inner side wall of the freehub body, where a soft PCB is disposed in the soft PCB via hole, one end of the soft PCB is connected to the speed sensing Hall, and another end of the soft PCB passes through the soft PCB via hole and is connected to the secondary signal processor. A connection line of a torque sensing strain gauge is disposed in the torque signal line groove, and a connection line of the speed sensing Hall is disposed in the speed sensing line groove.

The load connection portion of the freehub body is rollingly connected to one end of the axle shaft, and another end of the freehub locking bracket body or the freehub fixing housing is rollingly connected to another end of the axle shaft.

In the freehub torque and speed sensing device provided in the present application, a torque sensor can be integrated into the freehub of the electric bicycle or the bicycle so that the whole vehicle assembly is more convenient and safer, bilateral torque and speed sensing are achieved, and an advantage of a reasonable structure is ensured. Power supply and signal transmission of the sensor are achieved through wireless power transmission technology or infrared transmission, and the advantages of long service life, simple production and assembly, and high signal stability are ensured.

Figure 1:
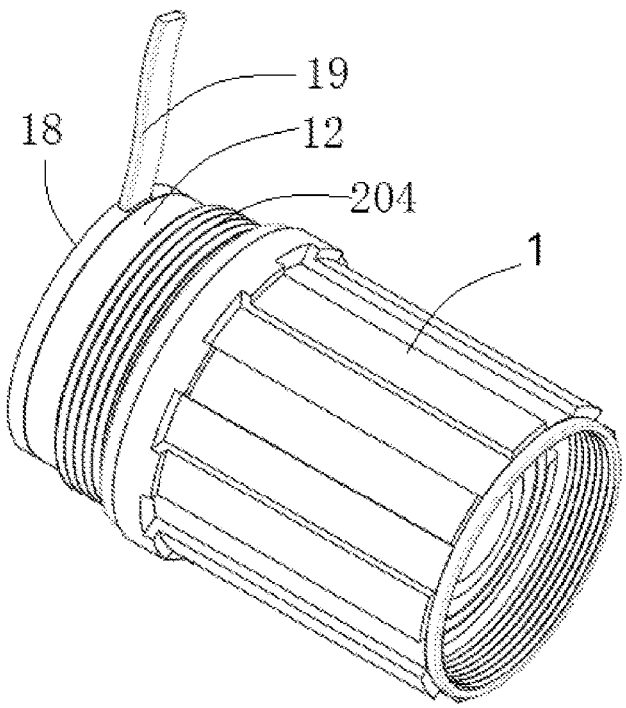
FIG. 1 is a schematic structure view of a freehub torque and speed sensing device according to an embodiment of the present application.

REFERENCE LIST 1 freehub fixing housing
2 freehub body
3 freehub locking bracket body
4a rolling ball
4b rolling ball
5 speed sensing magnetic ring
6 pawl
7a bearing
7b bearing
8 pawl wire spring
9 speed sensing Hall
10 soft PCB
11 torque sensing strain gauge
12 dynamic assembly housing
13 secondary signal processor
14 secondary electromagnetic shielding body
141 primary electromagnetic shielding body
15 secondary induction coil
16 primary induction coil
17 primary signal processor
18 static assembly housing
19 signal output line
201 speed Hall fixing groove
202 pawl groove
203 torque sensing deformation unit
204 load connection portion
205 rolling ball groove
206 freehub locking bracket body connection portion
207 torque signal line groove
208 soft PCB via hole
209 speed sensing line groove
21 infrared component
30 axle shaft
40 rear wheel hub or rear hub motor
50 flywheel

DETAILED DESCRIPTION

Solutions of the present application will be described in detail in conjunction with drawings and embodiments.

Figure 2:
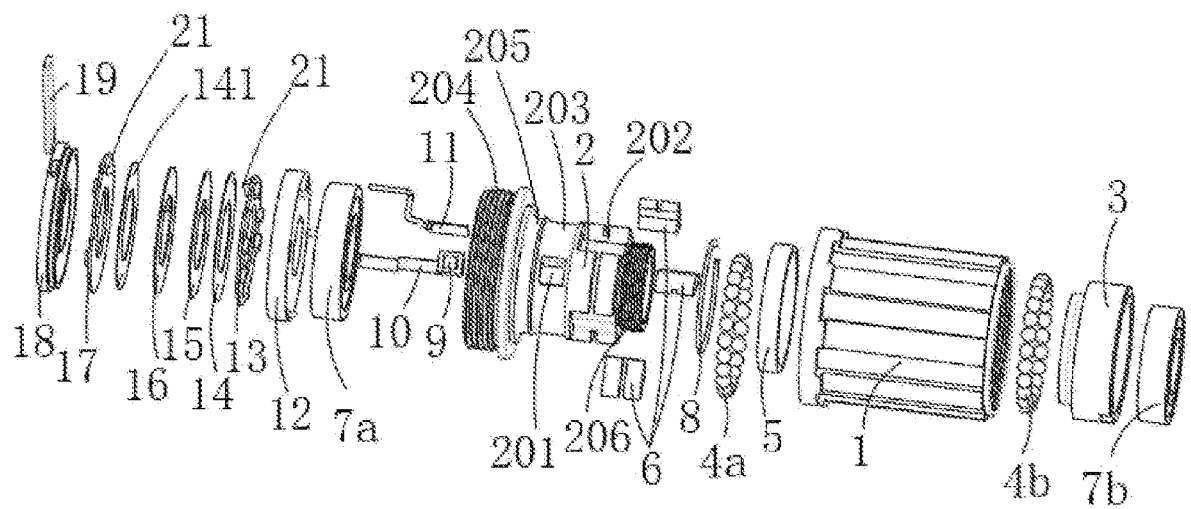
FIG. 2 is an exploded view of a freehub torque and speed sensing device according to an embodiment of the present application.
Figure 3:
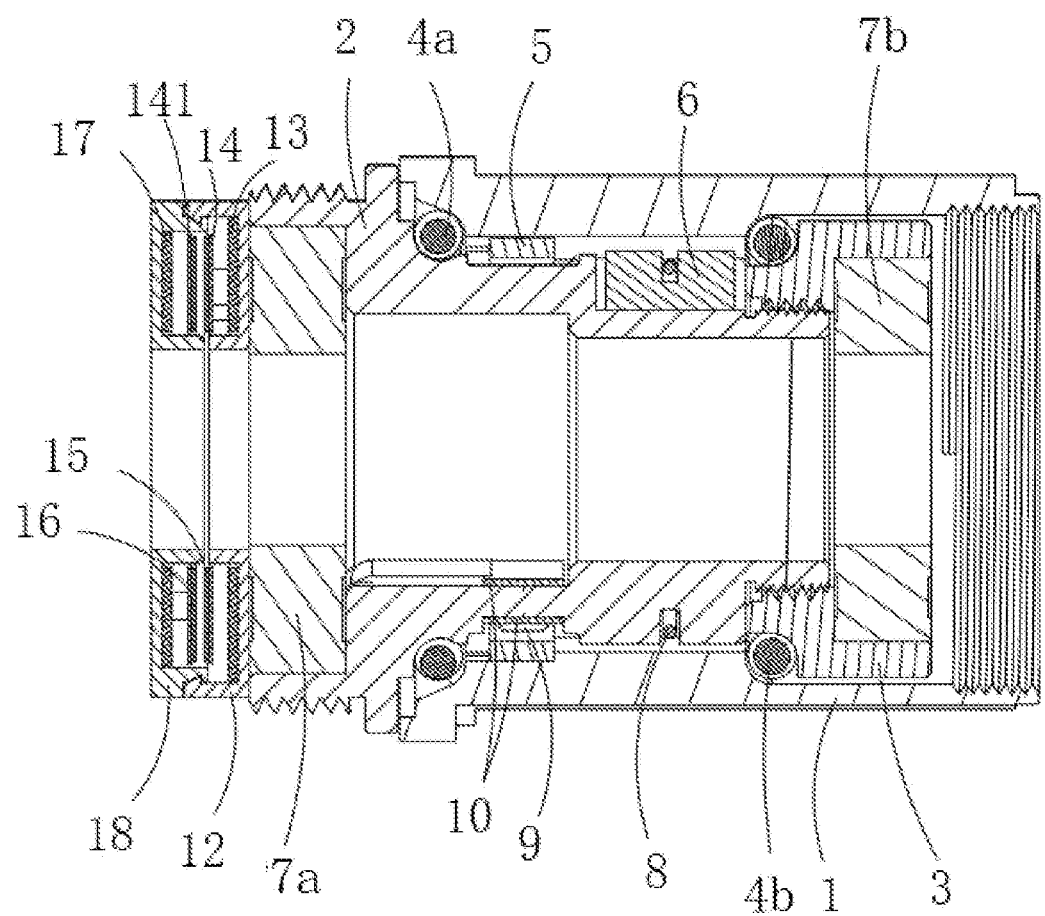
FIG. 3 is a sectional view of a freehub torque and speed sensing device according to an embodiment of the present application.
Figure 4:
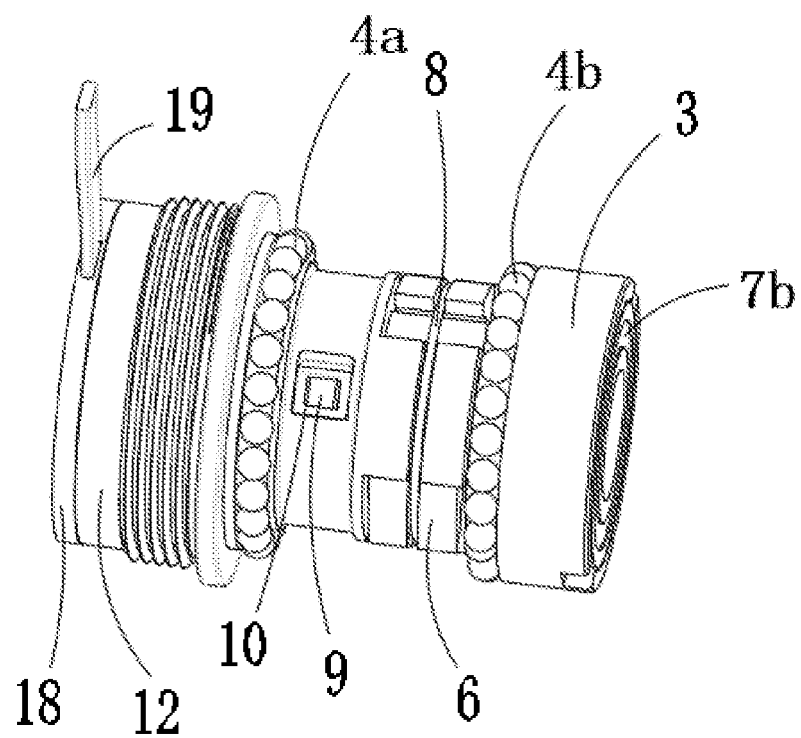
FIG. 4 is a partial structure view of FIG. 1.
Figure 5:
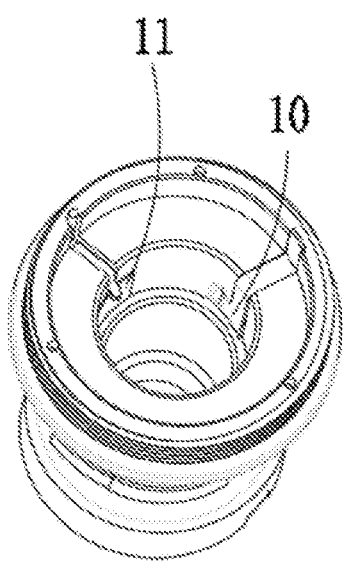
FIG. 5 is a partial structure view of FIG. 4.
Figure 6:
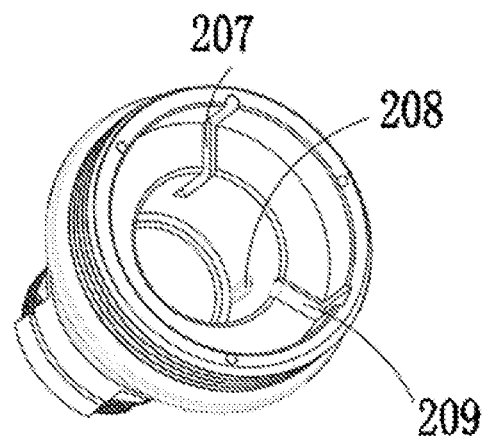
FIG. 6 is a partial structure view of FIG. 5.
Figure 7:
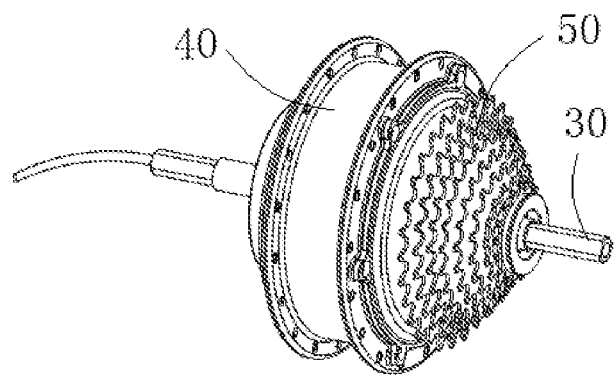
FIG. 7 is a schematic structure view of a freehub torque and speed sensing device in a use state according to an embodiment of the present application.
Figure 8:
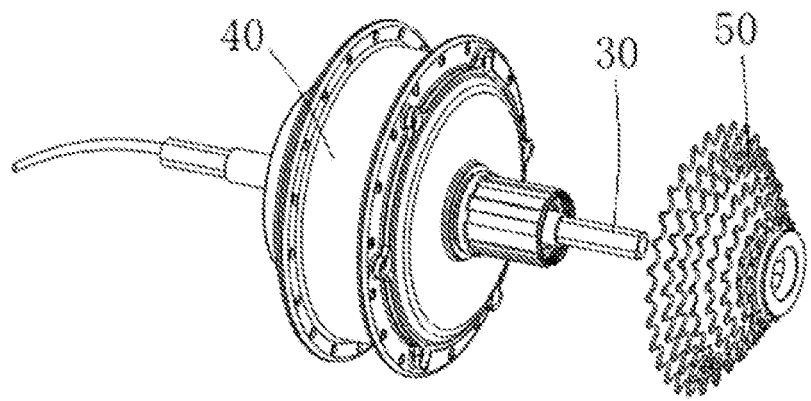
FIG. 8 is a first exploded view of FIG. 7.
Figure 9:
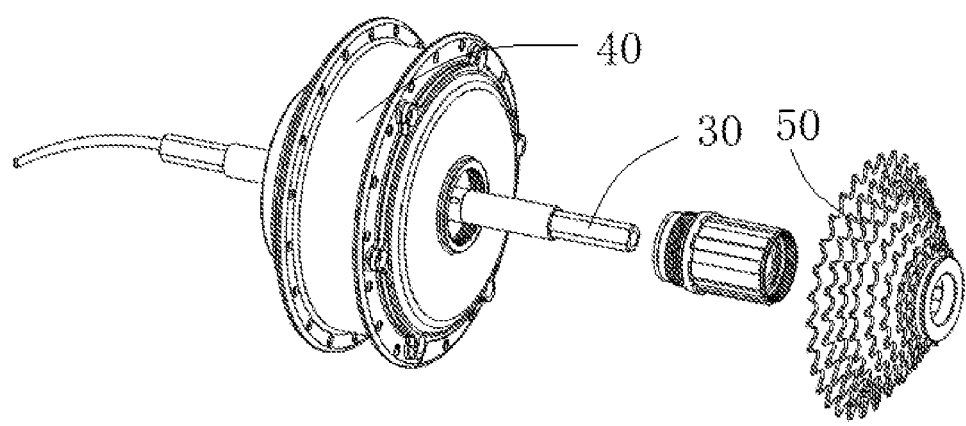
FIG. 9 is a second exploded view of FIG. 7.

As shown in FIGS. 1 to 9, this example provides a freehub torque and speed sensing device. The freehub torque and speed sensing device includes a freehub. The freehub is assembled on an axle shaft 30 of a rear wheel of a bicycle or an electric bicycle and includes a freehub body 2 and a freehub fixing housing 1. The freehub fixing housing 1 is sleeved on an outer side of the freehub body 2. A load connection portion 204 is disposed at one end of the freehub body 2, and the load connection portion 204 is connected to a rear wheel hub or a rear hub motor 40 of the bicycle or the electric bicycle.

A torque sensing deformation unit 203 is disposed at a position of the freehub body 2 adjacent to the load connection portion 204, and the torque sensing deformation unit 203 includes at least one sensor, where the sensor is configured to sense a deformation magnitude of the torque sensing deformation unit 203 and form a torque signal.

The freehub torque and speed sensing device further includes a dynamic assembly and a static assembly. The dynamic assembly rotates along with the freehub body 2. The static assembly is fixedly connected to an external fixing structure body and includes a primary control unit. The dynamic assembly includes a secondary control unit. The sensor is electrically connected to the secondary control unit. The torque signal is transmitted between the primary control unit and the secondary control unit in a wireless manner, and the primary control unit supplies power to the secondary control unit in the wireless manner.

In this embodiment, the sensor is integrated into the freehub, and the signal is transmitted in the wireless manner so that it is easy to produce and assemble the freehub, and the signal stability is high. In an embodiment, a rolling ball groove 205 is disposed at a position of the freehub body 2 adjacent to the load connection portion 204, rolling balls 4a are disposed in the rolling ball groove 205, and the freehub fixing housing 1 is rollingly connected to the freehub body 2 through the rolling balls 4a. A freehub locking bracket body connection portion 206 is disposed at another end of the freehub body 2, the freehub locking bracket body connection portion 206 is connected to a freehub locking bracket body 3, and the freehub locking bracket body connection portion 206 is connected to the freehub locking bracket body 3 through threads. In other embodiments, other connection manners may also be used as needed. The freehub locking bracket body 3 is rollingly connected to the freehub fixing housing 1 through rolling balls 4b. The rolling balls can not only roll circumferentially but also limit and fix the freehub fixing housing 1 with respect to the freehub body 1 in a left-and-right direction. In other embodiments, other connection manners such as connection through a bearing may also be used as needed, another end of the freehub body 2 may also be directly rollingly connected to the freehub fixing housing 1, and the freehub locking bracket body connection portion 206 may be used for position limiting.

In an embodiment, a pawl groove 202 is disposed on one side of the freehub body 2 adjacent to the freehub locking bracket body connection portion 206, the torque sensing deformation unit 203 is disposed on one side of the freehub body 2 adjacent to the load connection portion, multiple pawls 6 are fixed in the pawl groove 202 by a pawl wire spring 8, and the pawl wire spring 8 is used as a spring structure body for elastic fixing. The freehub fixing housing 1 applies a unidirectional torsion force to the freehub body 2 through the pawls 6, and the torsion force is transmitted to the load connection portion 204 of the freehub body 2 through the torque sensing deformation unit 203. A torque sensing strain gauge 11 is disposed on an inner side wall of the torque sensing deformation unit 203. The torque sensing strain gauge 11 is used as a sensor and configured to sense the deformation magnitude of torsion and of the torque sensing deformation unit 203 when the torque sensing deformation unit 203 is torqued by an external force.

In an embodiment, a bearing 7a is disposed in the load connection portion 204 of the freehub body 2, and the bearing 7a is connected to one end of the axle shaft 30. A bearing 7b is disposed in the freehub locking bracket body 3 and connected to the other end of the axle shaft 30, or one end of the freehub fixing housing 1 adjacent to the freehub locking bracket body 3 may also be directly connected to the axle shaft 30 through a bearing.

In an embodiment, a speed sensing magnetic ring 5 is disposed on an inner ring wall of the freehub fixing housing 1, and the speed sensing magnetic ring 5 is stationary with respect to the freehub fixing housing 1. The freehub body 2 is provided with a speed Hall fixing groove 201, a speed sensing Hall 9 is disposed in the speed Hall fixing groove 201, and the speed sensing magnetic ring 5 and the speed sensing Hall 9 are disposed correspondingly. The speed sensing Hall 9 senses a rotational speed of the speed sensing magnetic ring 5 to indirectly sense a rotational speed of the freehub fixing housing 1.

In an embodiment, the freehub torque and speed sensing device further includes a dynamic assembly and a static assembly. The dynamic assembly rotates along with the freehub body 2. The static assembly includes a primary control unit, and the dynamic assembly includes a secondary control unit. In the following embodiments, the dynamic assembly and the static assembly of the freehub torque and speed sensing device are described with examples.

The load connection portion 204 of the freehub body 2 is connected to a signal processor. The signal processor includes a primary signal processor 17 and a secondary signal processor 13. The secondary signal processor 13 is fixed to the load connection portion 204 at one end of the freehub body 2. The primary signal processor 17 and the freehub body 2 rotate relatively.

The static assembly includes the primary signal processor 17 and a primary induction coil 16, where the primary signal processor 17 is electrically connected to the primary induction coil 16. The dynamic assembly includes the secondary signal processor 13 and a secondary induction coil 15, where the secondary signal processor 13 is electrically connected to the secondary induction coil 15. The dynamic assembly is connected to the load connection portion 204 of the freehub body 2, and the dynamic assembly rotates along with the freehub body 2. The static assembly and the freehub body 2 rotate relatively.

Wireless signal transmission is performed between the primary induction coil 16 and the secondary induction coil 15, and the primary signal processor 17 supplies power to the secondary signal processor 13 through the primary induction coil 16 and the secondary induction coil 15. Alternatively, wireless signal transmission is performed between the primary signal processor 17 and the secondary signal processor 13 through an infrared component 21, and the primary signal processor 17 supplies power to the secondary signal processor 13 through the primary induction coil 16 and the secondary induction coil 15.

In this embodiment, the dynamic assembly further includes a dynamic assembly housing 12, and the static assembly further includes a static assembly housing 18. The load connection portion 204 of the freehub body 2 is connected to one end of the dynamic assembly housing 12, and the static assembly housing 18 is clamped to another end of the dynamic assembly housing 12. The dynamic assembly housing 12 is connected to the secondary signal processor 13, the secondary signal processor 13 is connected to the secondary induction coil 15, the static assembly housing 18 is connected to the primary signal processor 17, the primary signal processor 17 is connected to the primary induction coil 16, and the primary induction coil 16 and the secondary induction coil 15 are disposed correspondingly. The secondary induction coil 15 and the primary induction coil 16 are configured to transmit power.

In another embodiment, to save costs and simplify the overall structural components, the dynamic assembly housing 12 may not be provided. The load connection portion 204 is directly clamped to the static assembly housing 18, the load connection portion 204 is connected to the secondary signal processor 13, and the secondary signal processor 13 is connected to the secondary induction coil 15.

A primary electromagnetic shielding body 141 is further disposed on an outer side of the primary induction coil 16, and a secondary electromagnetic shielding body 14 is further disposed on an outer side of the secondary induction coil 15. The primary electromagnetic shielding body 141 and the secondary electromagnetic shielding body 14 are configured to isolate electromagnetic interference between the outside and both the primary induction coil 16 and the secondary induction coil 15 and improve power transmission of coils.

The static assembly housing 18 performs information transmission with the external through a signal output line 19, and the static assembly housing 18 is fixedly connected to an external fixing structure body. For example, the static assembly housing 18 is connected to a stator of a rear drive motor or the rear wheel hub.

The speed sensing Hall 9 and the torque sensing strain gauge 11 are electrically connected to the secondary signal processor 13. Information such as the torque signal and speed processed by the secondary signal processor 13 is transmitted to the primary signal processor 17 through the secondary induction coil 15 and the primary induction coil 16 in a wireless transmission manner. Alternatively, the information such as the torque signal and speed is transmitted to the primary signal processor 17 through the infrared component 21 between the primary signal processor 17 and the secondary signal processor 13 in a wireless infrared signal transmission manner. The primary signal processor 17 processes the information such as torque and speed and outputs the information to an external signal processor unit through the signal output line 19 or a wireless signal. Moreover, the primary signal processor 17 supplies power to the secondary signal processor 13 through the primary induction coil 16 and the secondary induction coil 15.

As shown in FIGS. 2 to 6, a torque signal line groove 207, a soft printed circuit board (PCB) via hole 208, and a speed sensing line groove 209 are disposed on an inner side wall of the freehub body 2. A soft PCB 10 is disposed in the soft PCB via hole 208. One end of the soft PCB 10 is connected to the speed sensing Hall 9, and the other end of the soft PCB 10 passes through the soft PCB via hole 208 and is connected to the secondary signal processor 13. A connection line of the torque sensing strain gauge 11 is disposed in the torque signal line groove 207, and a connection line of the speed sensing Hall 9 is disposed in the speed sensing line groove 209.

The working principle of the freehub torque and speed sensing device provided in this embodiment is described below.

An external force, that is, a torsion force, is applied to the freehub fixing housing 1 through a flywheel 50, the freehub fixing housing 1 transmits the torsion force to the pawl groove 202 of the freehub body 2 through the pawls 6, and then the torsion force is transmitted to the load connection portion 204 through the torque sensing deformation unit 203. In this process, the torque sensing deformation unit 203 generates deformation corresponding to the magnitude of the torsion force, and the torque sensing strain gauge 11 senses the magnitude of the torsion force and transmits an electrical signal with a resistance value corresponding to the magnitude of the torsion force to the secondary signal processor 13. Moreover, the speed sensing Hall 9 senses the rotational speed and direction of the freehub fixing housing 1 through the speed sensing magnetic ring 5 and transmits the rotational speed and direction of the freehub fixing housing 1 to the secondary signal processor 13. The secondary signal processor 13 transmits the received torque signal and speed signal to the relatively stationary primary signal processor 17 through induction coils or the infrared component and then the primary signal processor 17 transmits the torque signal and speed signal to the outside. In this process, the primary signal processor 17 supplies power to the secondary signal processor 13 through the primary induction coil 16 and the secondary induction coil 15.

In the present application, a torque sensor is integrated into the freehub of the electric bicycle so that bilateral torque and speed sensing can be achieved, the whole vehicle assembly is more convenient and safer, and the structure of the vehicle is reasonable. Power supply and signal transmission of the sensor are achieved through wireless power transmission technology or infrared transmission technology, and the advantages of long service life, simple production and assembly, and high signal stability are ensured.

What is claimed is:

1. A freehub torque and speed sensing device, comprising a freehub, wherein
   the freehub is assembled on an axle shaft of a rear wheel of a bicycle or an electric bicycle and comprises a freehub body and a freehub fixing housing, wherein the freehub fixing housing is sleeved on an outer side of the freehub body, and a load connection portion is disposed at one end of the freehub body and connected to a rear wheel hub or a rear hub motor of the bicycle or the electric bicycle,
   a torque sensing deformation unit is disposed at a position of the freehub body adjacent to the load connection portion and comprises at least one sensor, wherein the at least one sensor is configured to sense a deformation magnitude of the torque sensing deformation unit and form a torque signal; and
   the freehub torque and speed sensing device further comprises a dynamic assembly and a static assembly, wherein the dynamic assembly is configured to rotate along with the freehub body, the static assembly is fixedly connected to an external fixing structure body and comprises a primary control unit, and the dynamic assembly comprises a secondary control unit, wherein the at least one sensor is electrically connected to the secondary control unit, the primary control unit and the secondary control unit are configured to transmit the torque signal between the primary control unit and the secondary control unit in a wireless manner, and the primary control unit is configured to supply power to the secondary control unit in the wireless manner,
   wherein the static assembly comprises a primary signal processor and a primary induction coil, wherein the primary signal processor is electrically connected to the primary induction coil; the dynamic assembly comprises a secondary signal processor and a secondary induction coil, wherein the secondary signal processor is electrically connected to the secondary induction coil; and the dynamic assembly is connected to the load connection portion of the freehub body, the primary induction coil and the secondary induction coil are configured to perform signal transmission between the primary induction coil and the secondary induction coil in the wireless manner, and the primary signal processor is configured to supply power to the secondary signal processor through the primary induction coil and the secondary induction coil; or the primary signal processor and the secondary signal processor are configured to perform wireless signal transmission between the primary signal processor and the secondary signal processor through an infrared component, and the primary signal processor is configured to supply power to the secondary signal processor through the primary induction coil and the secondary induction coil,
   wherein the dynamic assembly further comprises a dynamic assembly housing, and the static assembly further comprises a static assembly housing, wherein the load connection portion of the freehub body is connected to one end of the dynamic assembly housing, and the static assembly housing is clamped to another end of the dynamic assembly housing; and the dynamic assembly housing is connected to the secondary signal processor, the secondary signal processor is connected to the secondary induction coil, the static assembly housing is connected to the primary signal processor, the primary signal processor is connected to the primary induction coil, and the primary induction coil and the secondary induction coil are disposed correspondingly.

2. The freehub torque and speed sensing device of claim 1, wherein the freehub fixing housing is rollingly connected to the freehub body.

3. The freehub torque and speed sensing device of claim 1, wherein a freehub locking bracket body connection portion is disposed at another end of the freehub body facing away from the load connection portion, wherein the freehub locking bracket body connection portion is connected to a freehub locking bracket body.

4. The freehub torque and speed sensing device of claim 1, wherein a pawl groove is disposed on a circumferential surface of the freehub body adjacent to a freehub locking bracket body connection portion, wherein a plurality of pawls are fixed in the pawl groove through a spring structure body.

5. The freehub torque and speed sensing device of claim 1, wherein a primary electromagnetic shielding body is disposed on an outer side of the primary induction coil, and a secondary electromagnetic shielding body is disposed on an outer side of the secondary induction coil.

6. The freehub torque and speed sensing device of claim 1, wherein a speed sensing magnetic ring is disposed on an inner ring wall of the freehub fixing housing and relatively stationary with respect to the freehub fixing housing, and the freehub body is provided with a speed Hall fixing groove, wherein a speed sensing Hall is disposed in the speed Hall fixing groove, and the speed sensing magnetic ring and the speed sensing Hall are disposed correspondingly.

7. The freehub torque and speed sensing device of claim 1, wherein the static assembly housing is connected to a signal output line.

8. The freehub torque and speed sensing device of claim 6, wherein
   a torque signal line groove, a soft printed circuit board (PCB) via hole, and a speed sensing line groove are disposed on an inner side wall of the freehub body, wherein a soft PCB is disposed in the soft PCB via hole, one end of the soft PCB is connected to the speed sensing Hall, and another end of the soft PCB passes through the soft PCB via hole and is connected to the secondary signal processor; and
   a connection line of a torque sensing strain gauge is disposed in the torque signal line groove, and a connection line of the speed sensing Hall is disposed in the speed sensing line groove.

9. The freehub torque and speed sensing device of claim 3, wherein the load connection portion of the freehub body is rollingly connected to one end of the axle shaft, and another end of the freehub locking bracket body or the freehub fixing housing is rollingly connected to another end of the axle shaft.

10. The freehub torque and speed sensing device of claim 1, wherein the freehub fixing housing is rollingly connected to the freehub body.

11. The freehub torque and speed sensing device of claim 1, wherein a freehub locking bracket body connection portion is disposed at another end of the freehub body facing away from the load connection portion, wherein the freehub locking bracket body connection portion is connected to a freehub locking bracket body.

12. The freehub torque and speed sensing device of claim 1, wherein a pawl groove is disposed on a circumferential surface of the freehub body adjacent to a freehub locking bracket body connection portion, wherein a plurality of pawls are fixed in the pawl groove through a spring structure body.

13. The freehub torque and speed sensing device of claim 1, wherein a speed sensing magnetic ring is disposed on an inner ring wall of the freehub fixing housing and relatively stationary with respect to the freehub fixing housing, and the freehub body is provided with a speed Hall fixing groove, wherein a speed sensing Hall is disposed in the speed Hall fixing groove, and the speed sensing magnetic ring and the speed sensing Hall are disposed correspondingly.

14. The freehub torque and speed sensing device of claim 5, wherein the static assembly housing is connected to a signal output line.

15. The freehub torque and speed sensing device of claim 7, wherein
   a torque signal line groove, a soft printed circuit board (PCB) via hole, and a speed sensing line groove are disposed on an inner side wall of the freehub body, wherein a soft PCB is disposed in the soft PCB via hole, one end of the soft PCB is connected to the speed sensing Hall, and another end of the soft PCB passes through the soft PCB via hole and is connected to the secondary signal processor; and
   a connection line of a torque sensing strain gauge is disposed in the torque signal line groove, and a connection line of the speed sensing Hall is disposed in the speed sensing line groove.

16. The freehub torque and speed sensing device of claim 2, wherein the load connection portion of the freehub body is rollingly connected to one end of the axle shaft, and another end of the freehub locking bracket body or the freehub fixing housing is rollingly connected to another end of the axle shaft.

17. A freehub torque and speed sensing device, comprising a freehub, wherein
   the freehub is assembled on an axle shaft of a rear wheel of a bicycle or an electric bicycle and comprises a freehub body and a freehub fixing housing, wherein the freehub fixing housing is sleeved on an outer side of the freehub body, and a load connection portion is disposed at one end of the freehub body and connected to a rear wheel hub or a rear hub motor of the bicycle or the electric bicycle,
   a torque sensing deformation unit is disposed at a position of the freehub body adjacent to the load connection portion and comprises at least one sensor, wherein the at least one sensor is configured to sense a deformation magnitude of the torque sensing deformation unit and form a torque signal; and
   the freehub torque and speed sensing device further comprises a dynamic assembly and a static assembly, wherein the dynamic assembly is configured to rotate along with the freehub body, the static assembly is fixedly connected to an external fixing structure body and comprises a primary control unit, and the dynamic assembly comprises a secondary control unit, wherein the at least one sensor is electrically connected to the secondary control unit, the primary control unit and the secondary control unit are configured to transmit the torque signal between the primary control unit and the secondary control unit in a wireless manner, and the primary control unit is configured to supply power to the secondary control unit in the wireless manner,
   wherein a speed sensing magnetic ring is disposed on an inner ring wall of the freehub fixing housing and relatively stationary with respect to the freehub fixing housing, and the freehub body is provided with a speed Hall fixing groove, wherein a speed sensing Hall is disposed in the speed Hall fixing groove, and the speed sensing magnetic ring and the speed sensing Hall are disposed correspondingly,
   wherein a torque signal line groove, a soft printed circuit board (PCB) via hole, and a speed sensing line groove are disposed on an inner side wall of the freehub body, wherein a soft PCB is disposed in the soft PCB via hole, one end of the soft PCB is connected to the speed sensing Hall, and another end of the soft PCB passes through the soft PCB via hole and is connected to a secondary signal processor; and a connection line of a torque sensing strain gauge is disposed in the torque signal line groove, and a connection line of the speed sensing Hall is disposed in the speed sensing line groove.

* * * * *